Patented Feb. 16, 1926.

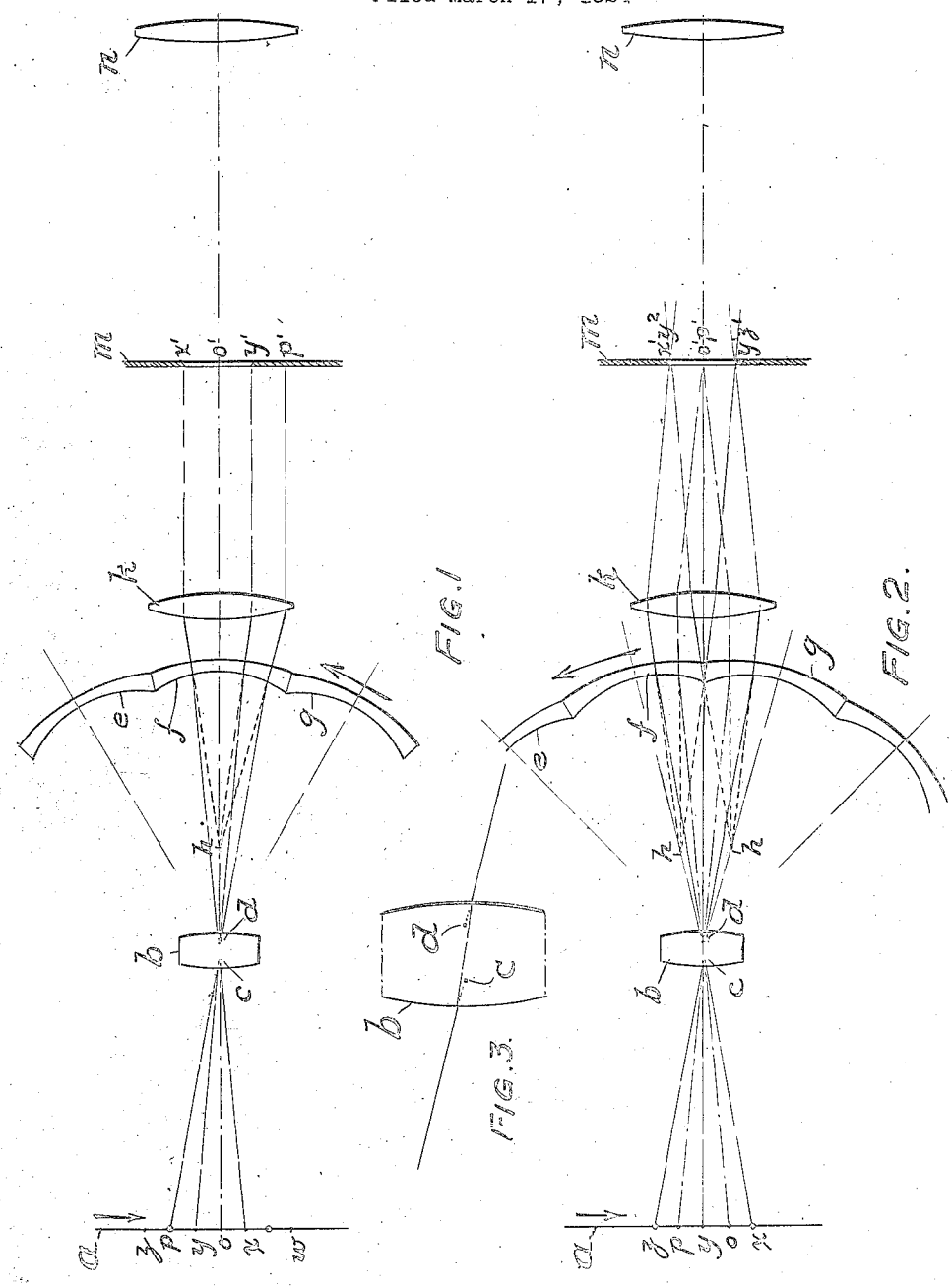

1,573,422

UNITED STATES PATENT OFFICE.

WILLIAM SALORIO, OF LANCASTER, PENNSYLVANIA.

MOTION-PICTURE MACHINE.

Application filed March 17, 1924. Serial No. 699,619.

*To all whom it may concern:*

Be it known that I, WILLIAM SALORIO, a citizen of the United States, residing at Lancaster, county of Lancaster, and State of Pennsylvania, have invented a new and useful Improvement in Motion-Picture Machines, of which the following is a full, clear, and exact description, reference being had to the accompanying drawings, which form a part of this specification.

My invention relates to motion picture projection machines of that known type in which the film moves continuously and light passing through the film and through a system of relatively fixed lenses and continuously moving lenses projects on the screen a succession of stationary images.

The object of my invention is to provide a system of lenses of such character and so co-related that, without any adjustments of the bodily position of either the film or any of the lenses, all images thrown upon the screen will be of the uniform dimensions and each image, at all positions of the individual picture being projected and at all positions of the moving lens system, will be of uniform dimensions.

The invention may be readily understood by reference to the following description in connection with the accompanying drawings, in which Figs. 1 and 2 are diagrams of the moving film and the lens systems in two different positions of the film and the moving lens system. Fig. 3 is a detail view of part of the fixed objective lens, showing the passage therethrough of a ray of light projected toward the rear nodal point of the lens and emerging as from the front nodal point of the lens.

The moving film $a$ is arranged to travel through a film gate so as to be exposed to the light for a length (say) of two pictures, the length between the heavy dots representing the lengthwise space of exposure. In Fig. 2, exactly two pictures are supposed to be exposed to light, one extending from $x$ to $y$ and the other from $y$ to $z$. In Fig. 1, which represents the film $a$ in an immediately preceding position distant one-half a picture length from the position shown in Fig. 2, the picture $x$—$y$ is wholly exposed, the picture $y$—$z$ half exposed and a picture $x$—$w$, in advance of picture $x$—$y$, half exposed. In each figure, $o$ represents the longitudinal center of picture $x$—$y$ and $p$ the longitudinal center of picture $y$—$z$. In Fig. 1, the picture $x$—$y$ is in a position central of the field of exposure so that its center $o$ is exactly in the central axis of the lens systems. In Fig. 2, the common edge of, or dividing line between, the two adjacent pictures is exactly in this central axis.

$b$ is a fixed objective lens or system of lenses. In the drawing this is shown as a single convex lens having a front nodal point $d$ and a rear nodal point $c$. Those skilled in optics can readily substitute a different lens or system of lenses having the same refractive effect, as hereinafter described, upon light rays passing thereto from the film.

$e$, $f$, $g$, etc. represent a series of concavo-convex spherical lenses rotatable about the nodal point $d$ as an axis, as hereinafter explained. The lenses $e$, $f$, $g$, in their rotation, pass through their operative field in a direction opposite to that of the film and travel at such speed that a single lens passes a given point in precisely the time required for a single film picture to pass a given point. The lenses $e$, $f$, $g$ are so positioned that when any picture is central to the axis of the lens system one of the moving lenses is also central to such axis. The lenses $e$, $f$, $g$ have other essential characteristics hereinafter described.

$h$ is a focusing lens or system of lenses whose focal plane coincides with the focal plane of the system. While this arrangement is not absolutely necessary, it is more convenient for the adjustment of the system.

$m$ is a screen positioned at such distance from the lens $o$ and provided with an aperture of such size as to accommodate within the aperture, a single image formed by the projection of a single picture or by a projection of two adjacent superimposed pictures or by a projection of one picture and part of an adjacent picture, as hereinafter explained. In other words, if the screen $m$ were imperforate, a small image of a single or composite picture would be projected thereon. It will therefore be understood that when these light rays pass through the aperture in screen $m$ and thence through the projection lens $n$ onto the exhibiting screen (not shown), the latter will display exactly one complete picture.

The combination of the lenses $e$, $f$, and $g$ and the objective lens $b$ must have one focal plane at the film gate and the other at infinity. This combination of lenses forms the foundation of the system. To understand the characteristics of this system of lenses involves knowledge of the character of the lenses, the position of the movable lenses relative to the forward nodal point $d$ of lens $b$ and the distance from the film gate to the rear nodal point $c$ or lens $b$.

The lenses $e$, $f$, $g$ are made aplanatic, the first aplanatic point being at the forward nodal point $d$ of lens $b$, which is also the center of rotation of the lenses $e$, $f$, $g$. All first aplanatic points of the lenses $e$, $f$, $g$ coincide at point $d$. It will be understood, however, that if, as hereinbefore stated, a different lens or system of lenses be substituted for the specific lens $b$ illustrated, the position physically occupied by the front nodal point $d$ may not be actually within the lens.

The second aplanatic point of each lens $e$, $f$, $g$ is at the point $h$. In the movement of any of the movable lenses, this point is constantly shifting from one side to the other of the fixed central axis of the lens system, being on said axis when the center of such movable lens is on said axis. At this point $h$ coincide all imaginary lines constituting rearward projections of light rays passing through such movable lens that have reached such movable lens by emerging from lens $b$ as from its front nodal point $d$.

The nature of the combination of fixed objective lens and movable lenses will be better understood by following a light ray projected from any point (say $y$, Fig. 1) of the moving film directly toward the first nodal point $c$ of lens $b$. As this ray is deflected through lens $b$ (see Fig. 3) it is bent down so as to pass through a point in lens $b$ midway between nodal points $c$ and $d$ and on emerging therefrom is deflected so as to take a course parallel with its original course and in a line which, if projected backward, would intersect the second nodal point $d$ of lens $b$. When the light ray is deflected through lens $f$, its direction therethrough is such that if projected backward it would intersect the second aplanatic point $h$, of the movable lenses.

In Fig. 1, as hereinbefore stated, a picture $x$—$y$ is central of the film gate, at which time a movable lens (say $f$) is central of the axis of the lens system. By following rays from points $x$ and $y$ directed toward the nodal point $c$ and passing through the fixed lens $b$, movable lens $f$ and fixed lens $k$ to the screen $m$, which is coincident with the second focal plane of the system, it will be understood that an inverted image of the picture will be formed in this plane between the points $x'$ and $y'$, which coincides with the aperture in screen $m$. Any light rays emanating from above point $y$ below point $x$ and directed toward the rear nodal point $c$ will strike the screen $m$ below or above its aperture.

In Fig. 2 the film is shown in such position that exactly two adjacent pictures are exposed to the light source. At this time, the travel of the movable lenses has advanced the lenses $f$ and $g$ to such position that the junction between them is on the axis of the system. By following rays from points $x$ and $y$ directed toward the nodal point $c$ and passing through the fixed lens $b$, movable lens $f$ and fixed lens $k$ to the screen $m$, an inverted image of the picture $x$—$y$ will be formed in the plane of $m$ between the points $x'$ and $y'$. By following rays from points $y$ and $z$ directed toward the nodal point $c$ and passing through the fixed lens $b$ movable lens $g$ and fixed lens $k$ to the screen $m$, an inverted image of the picture will be formed in the plane $m$ between the points $y^2$ and $z'$. As points $x'$ and $y^2$ coincide and points $y'$ and $z'$ coincide it will be understood that a composite image from pictures $x$—$y$ and $y$—$z$ will be formed in the plane $m$.

It will thus be understood that the movement of the film is balanced by the rotation of the movable lenses, producing a stationary image.

So far there have been considered only light rays that are directed toward rear nodal points $c$ of the fixed lens $b$. Any light ray passing through any point in the film picture and directed toward any other point in the fixed lens $b$ will, after passing through a movable lens and the fixed lens $k$, if it impinges in the plane of the screen $m$ within the aperture thereon, impinge at a point coincident with a ray of light passing through the same point in the film and directed toward the rear nodal point $c$ of the fixed lens $b$. However, for the purpose of describing and defining a lens system embodying my invention, it is necessary only to consider light rays passing through the film and directed toward the rear nodal point $c$ of the fixed lens $b$ and emerging as from the front nodal point $d$ (which coincides with the first aplanatic point of the lens system) and to note that all such rays pass through a movable lens in such direction that if projected backward they would coincide at the second aplanatic point ($h$) of the lens system.

By the use of my improved lens system all images formed at the aperture in the plane $m$, or projected, greatly magnified, through lens $n$ to the exhibition screen, will be, at all positions of the movable lens, of uniform size. There is, therefore, no alternate enlargement and contraction of the dimensions of the exhibited image, no alternate distortion and righting, and no flickering. These results are accomplished without the necessity of automatically shifting the positions of any of the lenses or the position of the film and indeed without providing for any compensating adjustments of any part of the system; the only moving parts being the film and the movable compensating series of lens, each of which has a steady and uniform movement of progression. By means of my improved system, therefore, I avoid the necessity of providing complicated mechanism adapted to compensate for non-uniform images produced by cooperating fixed and movable lenses that do not have the characteristics and relations herein described. Such supplemental mechanism is not only expensive to construct, but is liable to get out of order and cannot be restored to working conditions by one who is without the highest degree of skill. My improved lens system has also the advantage that any optical manufacturer who is given an order for aplanatic lenses of given size and of given degrees of curvature can furnish the lenses without the necessity of specially educating his workmen; the method of production of such lenses being within the knowledge of any skilled artisan in the optical industry. The expense of manufacturing the lenses is therefore relatively moderate, so that the cost of the finished machine is within entirely reasonable limits.

To produce the best results, the original pictures should be taken at a rate of speed greatly in excess of the conventional sixteen pictures per second. Such pictures can be taken by means of a slow motion camera of the regular intermittently actuated type. The pictures should be projected at or near the rate at which they are taken, thereby projecting on the exhibition screen a relatively large number of pictures per second and giving an effect of smoothness and continuity that is impossible with the standard intermittently actuated projection machine.

Having now fully described my invention what I claim and desire to protect by Letters Patent is:

1. In a motion picture machine, the combination of a continuously movable film, a fixed objective lens on front of the film having front and rear nodal points, a continuously rotatable series of spherical lenses which travel in front of the fixed objective lens, and a fixed focusing lens in front of said path of travel of the rotatable lenses; the rotatable lenses being aplanatic and all of which have a common aplanatic point which is coincident with the axis of rotation of the rotatable lenses and with the front nodal point of the objective lens.

2. In a motion picture machine, the combination of a continuously movable film, a fixed objective lens in front of the film having front and rear nodal points, a continuously rotatable series of spherical lenses whose axis of rotation is optically coincident with said front nodal point and which, while functioning, travel in front of the fixed objective lens, and a fixed focusing lens in front of said path of travel of the rotatable lenses, the degree of curvature of the inner surface of each lens and the relative positioning of the rotatable lenses and the fixed objective lens being such that all rays of light from the film directed toward the rear nodal point of the fixed objective lens and emerging as from the front nodal point of the fixed objective lens will be refracted through the movable lens, at all functioning positions thereof, in such direction that if projected backward they will intersect at a common point.

3. In a moving picture machine, the combination of a continuously movable film, a fixed objective lens in front of the film having front and rear nodal points, a series of spherical aplanatic lenses rotatable on an axis coincident with said front nodal point and which travel in front of the fixed objective lens, and a fixed focusing lens in front of said path of travel of the rotatable lenses, each of said rotatable lenses, while functioning, having one fixed aplanatic point coincident with the front nodal point of the objective lens and one movable aplanatic point between said rotatable lens and the fixed objective lens.

4. In a motion picture machine, the combination of a continuously movable film, a fixed objective lens on front of the film having front and rear nodal points, a continuously rotatable series of spherical lenses which travel in front of the fixed objective lens, and a fixed focusing lens in front of said path of travel of the rotatable lenses; the rotatable lenses being aplanatic and all of which have two aplanatic points one of which is fixed and coincident with the axis of rotation of the rotatable lenses and with the front nodal point of the objective lens, the focal plane of the focusing lens coinciding with the focal plane of the optical system.

In testimony of which invention, I have hereunto set my hand, at Philadelphia, Penna., on this 3rd day of March, 1924.

WILLIAM SALORIO.